United States Patent [19]
von Roesgen

[11] 3,959,589
[45] May 25, 1976

[54] DIGITAL BIT STREAM SYNCHRONIZER

[75] Inventor: Charles Alphonse von Roesgen, Westfield, N.J.

[73] Assignee: Bell Telephone Laboratories, Incorporated, Murray Hill, N.J.

[22] Filed: June 23, 1975

[21] Appl. No.: 589,333

[52] U.S. Cl............................................ 178/69.5 R
[51] Int. Cl.²........................................... H04L 7/08
[58] Field of Search............ 179/15 BS; 178/69.5 R, 178/53.1; 328/72, 73, 75, 63

[56] References Cited
UNITED STATES PATENTS

| | | | |
|---|---|---|---|
| 3,251,034 | 5/1966 | Goode et al. | 340/146.1 |
| 3,539,997 | 11/1970 | Mahoney | 179/15 BS |
| 3,730,998 | 5/1973 | Schmidt et al. | 178/69.5 R |

OTHER PUBLICATIONS

Bell Laboratories Record: Vol. 49, No. 7: Aug. 1971, pp. 198–202, Geigel, "Monitoring the Performance of Digital Multiplex Circuits."

Primary Examiner—Benedict V. Safourek
Attorney, Agent, or Firm—Richard J. Roddy

[57] ABSTRACT

A digital data communication system typically includes arrangements for achieving synchronization of the digital data processed by the system. However, known synchronizing arrangements are usually inefficient with respect to the time required to achieve bit synchronization. To shorten the time required for synchronization of two bit streams, an improved synchronizer including a sequential store, a plurality of comparators, a circulating memory having a plurality of memory registers, and a control circuit is disclosed. A first bit stream is extended through the sequential store into respective first inputs of the plurality of comparators. Each bit of a second bit stream jointly feeds all respective second inputs of the comparators. Using negative logic, each comparator output is NANDed with a first memory register output and fed into a second register input. When all but one of the memory register outputs are set, synchronization is achieved.

17 Claims, 9 Drawing Figures

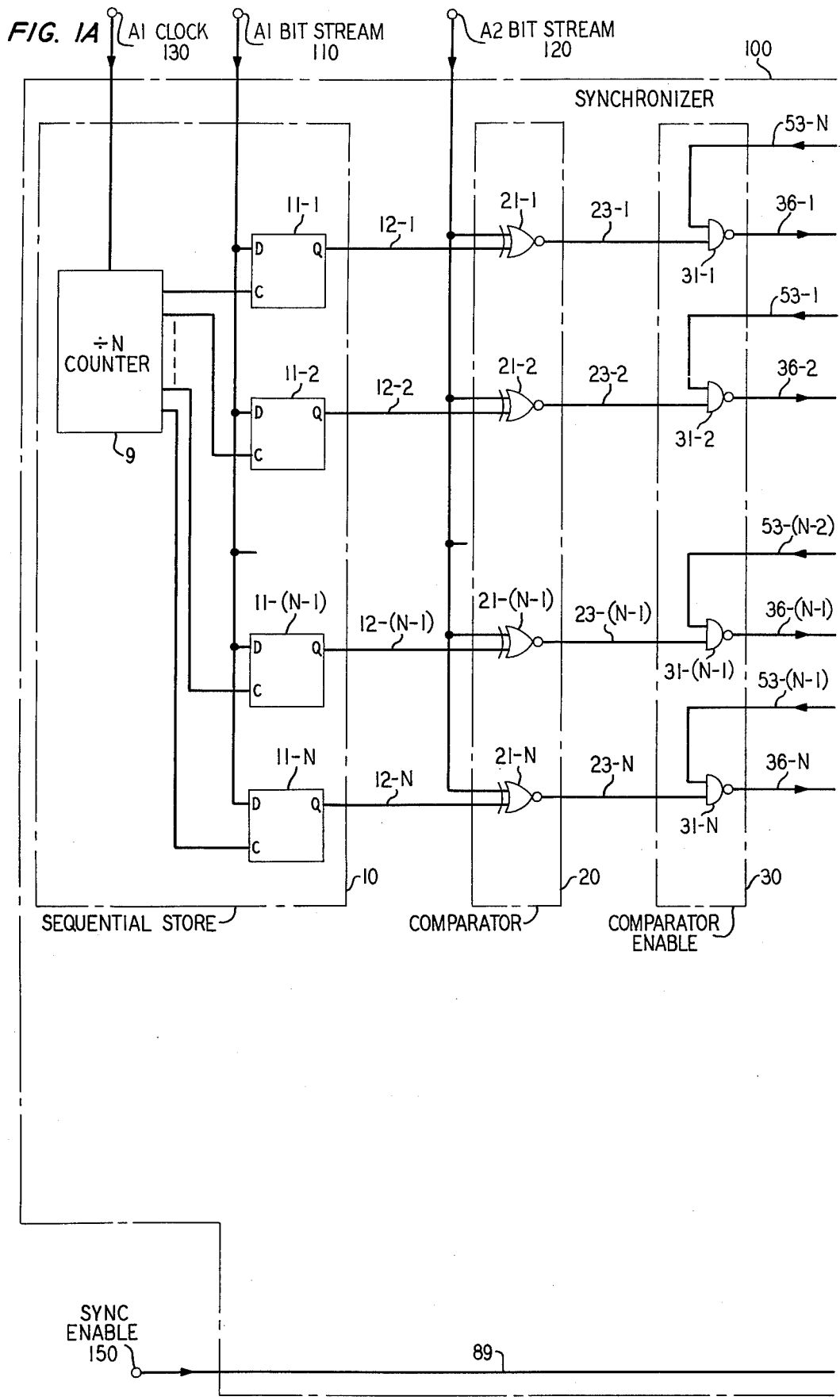

FIG.2

| BIT NUMBER | 1 | 2 | 3 | 4 | 5 | 6 | 7 | 8 | 9 | 10 | 11 | 12 | 13 |
|---|---|---|---|---|---|---|---|---|---|---|---|---|---|
| BIT STREAM | 1 | 0 | 1 | 1 | 0 | 0 | 1 | 1 | 0 | 1 | 0 | 1 | 1 |

FIG.3A

| A2 BIT AT TERMINAL 120 | LEADS | SIGNAL ON LEAD | | | | | | | |
|---|---|---|---|---|---|---|---|---|---|
| | | -1 | -2 | -3 | -4 | -5 | -6 | -7 | -8 |
| 0 | 12-1 TO 12-8 | 1 | 0 | 1 | 1 | 0 | 0 | 1 | 1 |
| | 23-1 TO 23-8 | 0 | 1 | 0 | 0 | 1 | 1 | 0 | 0 |
| | 36-1 TO 36-8 | 1 | 0 | 1 | 1 | 0 | 0 | 1 | 1 |
| | 53-1 TO 53-8 | 0 | 1 | 0 | 0 | 1 | 1 | 0 | 0 |

FIG.3B

| A2 BIT AT TERMINAL 120 | LEADS | SIGNAL ON LEAD | | | | | | | |
|---|---|---|---|---|---|---|---|---|---|
| | | -1 | -2 | -3 | -4 | -5 | -6 | -7 | -8 |
| 1 | 12-1 TO 12-8 | 0 | 0 | 1 | 1 | 0 | 0 | 1 | 1 |
| | 23-1 TO 23-8 | 0 | 0 | 1 | 1 | 0 | 0 | 1 | 1 |
| | 36-1 TO 36-8 | 1 | 1 | 0 | 1 | 1 | 1 | 0 | 1 |
| | 53-1 TO 53-8 | 0 | 0 | 1 | 0 | 0 | 0 | 1 | 0 |

FIG.3C

| A2 BIT AT TERMINAL 120 | LEADS | SIGNAL ON LEAD | | | | | | | |
|---|---|---|---|---|---|---|---|---|---|
| | | -1 | -2 | -3 | -4 | -5 | -6 | -7 | -8 |
| 1 | 12-1 TO 12-8 | 0 | 1 | 1 | 1 | 0 | 0 | 1 | 1 |
| | 23-1 TO 23-8 | 0 | 1 | 1 | 1 | 0 | 0 | 1 | 1 |
| | 36-1 TO 36-8 | 1 | 1 | 1 | 0 | 1 | 1 | 1 | 0 |
| | 53-1 TO 53-8 | 0 | 0 | 0 | 1 | 0 | 0 | 0 | 1 |

FIG.3D

| A2 BIT AT TERMINAL 120 | LEADS | SIGNAL ON LEAD | | | | | | | |
|---|---|---|---|---|---|---|---|---|---|
| | | -1 | -2 | -3 | -4 | -5 | -6 | -7 | -8 |
| 0 | 12-1 TO 12-8 | 0 | 1 | 0 | 1 | 0 | 0 | 1 | 1 |
| | 23-1 TO 23-8 | 1 | 0 | 1 | 0 | 1 | 1 | 0 | 0 |
| | 36-1 TO 36-8 | 0 | 1 | 1 | 1 | 0 | 1 | 1 | 1 |
| | 53-1 TO 53-8 | 1 | 0 | 0 | 0 | 1 | 0 | 0 | 0 |

FIG.3E

| A2 BIT AT TERMINAL 120 | LEADS | SIGNAL ON LEAD | | | | | | | |
|---|---|---|---|---|---|---|---|---|---|
| | | -1 | -2 | -3 | -4 | -5 | -6 | -7 | -8 |
| 1 | 12-1 TO 12-8 | 0 | 1 | 0 | 1 | 0 | 0 | 1 | 1 |
| | 23-1 TO 23-8 | 0 | 1 | 0 | 1 | 0 | 0 | 1 | 1 |
| | 36-1 TO 36-8 | 1 | 0 | 1 | 1 | 1 | 1 | 1 | 1 |
| | 53-1 TO 53-8 | 0 | 1 | 0 | 0 | 0 | 0 | 0 | 0 |

FIG.3F

| A2 BIT AT TERMINAL 120 | LEADS | SIGNAL ON LEAD | | | | | | | |
|---|---|---|---|---|---|---|---|---|---|
| | | -1 | -2 | -3 | -4 | -5 | -6 | -7 | -8 |
| 0 | 12-1 TO 12-8 | 0 | 1 | 0 | 1 | 1 | 0 | 1 | 1 |
| | 23-1 TO 23-8 | 1 | 0 | 1 | 0 | 0 | 1 | 0 | 0 |
| | 36-1 TO 36-8 | 1 | 1 | 0 | 1 | 1 | 1 | 1 | 1 |
| | 53-1 TO 53-8 | 0 | 0 | 1 | 0 | 0 | 0 | 0 | 0 |

DIGITAL BIT STREAM SYNCHRONIZER

BACKGROUND OF THE INVENTION

1. Field of the Invention

This invention relates to digital communication systems and, more particularly, to synchronizing arrangements employed therein.

2. Description of the Prior Art

A digital data communication system such as a time-division multiplexing system typically includes arrangements situated at various points throughout to achieve bit synchronization of the digital data processed by the system. The digital data generally consists of a plurality of "words" of information, a "word" comprising a number of bits handled as a unit by the system. For a given format there are usually a fixed number of bits in each word. Frequently, a predetermined number of words constitutes a "frame" of data. Thus the nomenclature given the digital data often depends upon where the data are located within the system. To obviate such semantical hindrances and to particularize the broad utility of my invention, the more general phrase "bit stream" will be used hereinafter to describe a plurality of bits wherever the bits are located in the system.

In one type synchronization arrangement it is known to interpose a prefixed synchronizing bit sequence in the bit stream. A synchronizer detects the presence or absence of the prefixed sequence and determines that synchronization either has been achieved or is absent in response thereto.

A second type synchronization arrangement, to which the present invention pertains, includes apparatus for advantageously comparing two bit streams. Known comparison bit stream synchronizers usually store one bit stream in a buffer and compare a second bit stream bit-by-bit against the first bit stream. When a predetermined number of consecutive bits match, synchronization is assumed to have been achieved. Otherwise, synchronization is assumed to be absent.

Thus, in monitoring a plurality of bit streams a synchronizer has at least two functions: (1) to achieve synchronization and (2) to detect the absence of synchronization among the bit streams. Unfortunately, known synchronizers are inefficient with respect to the time required for accomplishing these functions.

Accordingly, an object of my invention is to provide a digital bit stream synchronizer which reduces the time for achieving synchronization among a plurality of bit streams.

SUMMARY OF THE INVENTION

This and other objects are attained in accordance with the principles of my invention in an improved circuit for synchronizing a plurality of bit streams. The circuit includes means for comparing each of a plurality of bits of a first bit stream with a single bit of a second bit stream. A match or mismatch comparison signal is provided by the comparing means and extended through an enable circuit to a memory having a plurality of registers. Responsive to each mismatch signal, one of the memory registers is set. Successive bits of the second bit stream are similarly compared individually with a plurality of first stream bits and when all but one of the memory registers are set, synchronization is achieved. Otherwise, according to another aspect of my invention, the absence of synchronization is indicated. Upon achieving synchronization, according to still another aspect of my invention, comparison of the bit streams continues so as to detect any subsequent bit mismatch, indicating an error among the plurality of bit streams.

BRIEF DESCRIPTION OF THE DRAWING

The invention should become more apparent from the following detailed description when taken in conjunction with the accompanying drawing in which:

FIGS. 1A and 1B taken together, with the latter arranged to the right of the former, illustrate one embodiment of a synchronizer in accordance with the principles of my invention;

FIG. 2 depicts a bit stream to exemplify the operation of the synchronizer in FIGS. 1A and 1B; and FIGS. 3A through 3F illustrate selected logic signals within the synchronizer of FIGS. 1A and 1B when the bit stream of FIG. 2 is applied thereto.

DETAILED DESCRIPTION

Figure 1B:
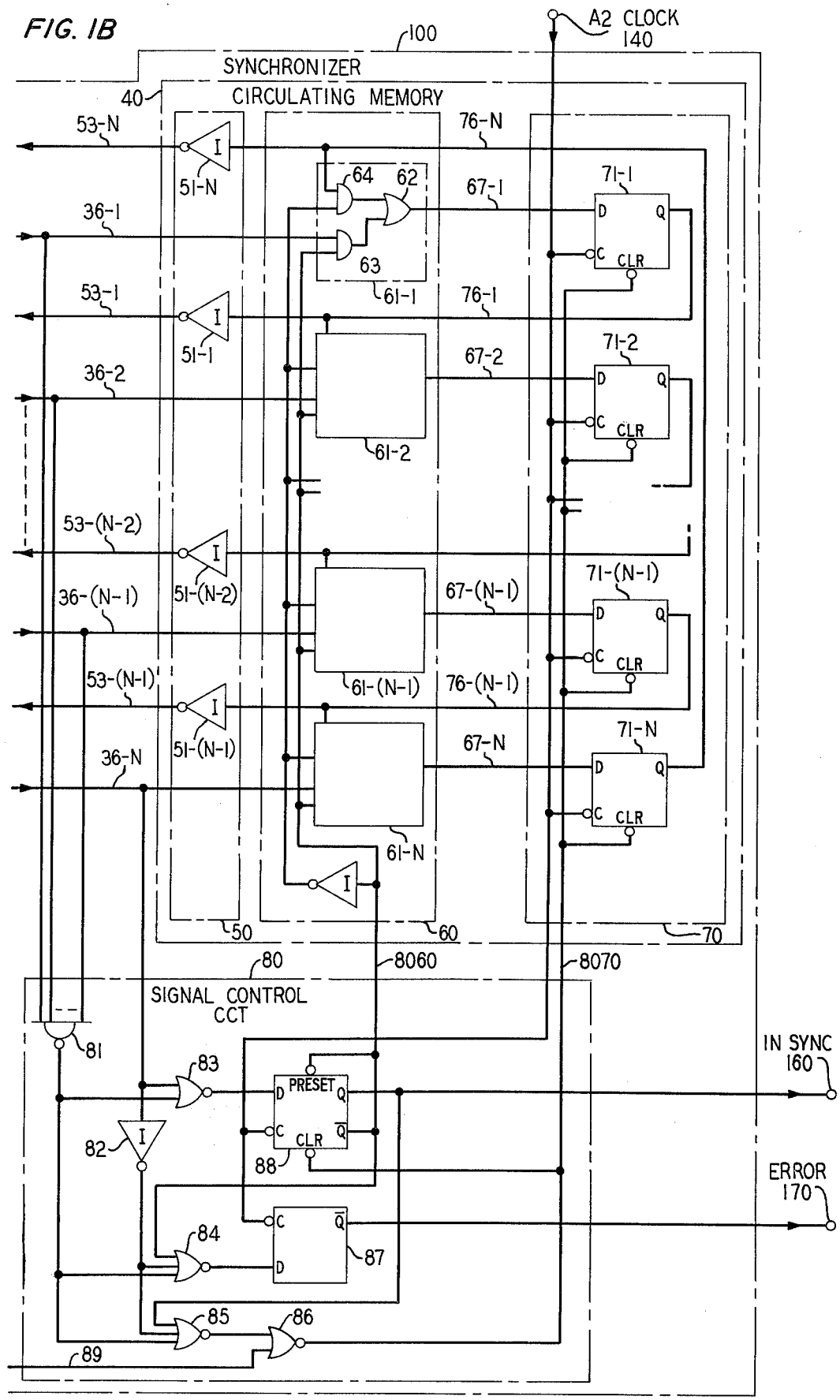

Broadly, a synchronizer of the type shown in FIGS. 1A and 1B functions to achieve synchronization among a plurality of identical bit streams. Looking at FIG. 1A, a first bit stream, called the A1 bit stream, is serially provided to A1 bit stream terminal 110 of synchronizer 100. Responsive to a bit clock pulse signal applied to A1 clock terminal 130, the A1 bit stream is clocked into sequential store 10, where N bits thereof are stored. The N bits of the A1 stream are thence parallelly extended to respective first inputs of comparator 20. Thereafter, a synchronization enable signal is provided to sync enable terminal 150 to initialize synchronizer 100. A second bit stream, called the A2 bit stream, is serially provided at A2 bit stream terminal 120 and extended jointly to all respective second inputs of comparator 20. Each bit of the A2 bit stream is thus simultaneously compared with the N bits of the A1 bit stream. Using negative logic, outputs of comparator 20 are NANDed by comparator enable 30 with outputs of circulating memory 40, illustratively shown in FIG. 1B. Outputs of comparator enable 30 are jointly extended to signal control circuit 80 and to respective memory registers of circulating memory 40. The registers are individually set according to a predesignated output of comparator enable 30. When all but one of the memory registers are set, synchronization has been achieved and an in-synchronization signal may be provided at in-sync terminal 160 by control circuit 80. Otherwise, synchronizer 100 has detected the absence of synchronization and provides an out-of-synchronization signal through control circuit 80 to terminal 160. Subsequently, as a result of an unfortuitous condition, for example, noise at a bit stream terminal causing a bit in the stream to be permuted, an output of enable 30 may be provided to set the remaining one of the memory registers. In response thereto, an error signal is provided at error terminal 170.

Thereby, in accordance with a broad object of my invention, synchronization is achieved between a plurality of bit streams more quickly than heretofore permitted with known means. Specifically, as the number of A1 bits which are stored in sequential store 10 is increased, i.e., as N is increased, the relative number of A2 bits, which on the average need be compared to achieve synchronization, decreases. For example, if store 10 stores only two bits of the A1 bit stream, i.e., if $N = 2$, three A2 bits on the average need be compared therewith to achieve synchronization between the two bit streams. Further, yet illustratively, if N = 4, four A2 bits need be compared; if N = 8, five A2 bits need be compared; and if N = 16, six A2 bits need be compared.

To more particularly describe the illustrative embodiment of my invention, the N bits of the A1 bit stream, applied to terminal 110, are stored sequentially in flip-flops 11-1 through 11-N of sequential store 10 via divide-by-N counter 9 in response to A1 clock pulses applied to terminal 130. An A1 bit remains in a particular flip-flop for N clock pulses whereupon it is overwritten by another A1 bit occurring N+1 bit positions later in the stream. The stored A1 bits are parallelly extended from sequential store 10 over leads 12-1 through 12-N to respective first inputs of exclusive NOR gates 21-1 through 21-N in comparator 20. The initializing synchronization enable signal, then applied to sync enable terminal 150, is extended over lead 89 through NOR logic gate 86 to clear (CLR) input of flip-flop 88 in signal control circuit 80. The enable signal is also extended by gate 86 over lead 8070 jointly to clear inputs of memory registers 71-1 through 71-N in circulating memory 40.

Each bit of the A2 bit stream, applied to terminal 120, is provided simultaneously to all respective second inputs of exclusive NOR gates 21-1 through 21-N. Thereby, a single bit of the A2 bit stream is compared simultaneously with all N bits of the A1 bit stream. An output of an exclusive NOR gate, provided over a respective one of leads 23-1 through 23-N, is illustratively, a logic one signal for each A1 bit which matches the A2 bit. Otherwise, the output is illustratively a logic zero signal indicating a mismatch between the respective A1 bit and the A2 bit.

At this juncture, it is worth observing that a match provides little positional information as to the synchronization between the A1 and A2 bit streams. Notwithstanding, known prior art synchronizers assume synchronization has been achieved upon detection of a predetermined number of consecutive bit matches. On the other hand, a mismatch provides greater positional information, to wit, that the streams are to be assumed out of synchronization. Accordingly, the subsequent detailed description of the principles of my invention should become more easily understood when studied from the point of view of bit mismatches rather than bit matches.

Continuing, the outputs of comparator 20 are connected to respective first inputs of NAND gates 31-1 through 31-N of comparator enable 30. Outputs of circulating memory 40 are extended to respective second inputs of the NAND gates in order to control a next adjacent memory register in a circulating manner hereinafter described. The outputs of comparator enable 30 are extended over leads 36-1 through 36-N jointly to control circuit 80 and, by way of selector switch 60, over leads 67-1 through 67-N to respective D inputs of memory registers 71-1 through 71-N. Thus, notwithstanding the logic signal provided by circulating memory 40 to the respective second inputs of the NAND gates of comparator enable 30, a logic zero mismatch signal will result in a respective memory register being set. Specifically, the mismatch signal is extended from comparator 20 through a respective NAND gate of enable 30, where it is inverted, to the respective memory register. Responsive to the mismatch signal and to an A2 clock pulse at terminal 140, the memory register is set to provide an output logic one signal to a corresponding lead 76-1 through 76-N. Thereby, a next adjacent NAND gate of comparator enable 30 is forced to provide a mismatch signal to its corresponding memory register when the next A2 bit is compared. Accordingly, a memory register is set even though its comparator may subsequently indicate bits match. When all but one memory register are set synchronization is achieved.

It is common to provide an in-synchronization signal after synchronization is achieved. However, the signal need not be provided immediately upon synchronization being achieved. Rather the in-synchronization signal may be delayed in a predetermined manner and thereafter provided. The particular arrangement employed typically involves a design tradeoff among a number of parameters, for example, among (1) the time delay between achieving and signaling, and (2) the cost of apparatus to detect and signal immediately upon achieving synchronization.

An illustrative embodiment of a delayed signaling arrangement is shown in FIG. 1B, where the in-synchronization signal is delayed until all memory registers are set except predetermined memory register 71-(N−1), which is not set, a condition detected by control circuit 80 in a manner now described. Turning attention to FIG. 1B, leads 36-1 through 36-(N−1) are jointly connected to respective inputs of NAND gate 81 of control circuit 80 and to switches 61-1 through 61-(N−1) of selector switch 60. Also, lead 36-N is jointly connected to a first input of NOR gate 83, inverter 82, and selector switch 61-N. An output of NAND gate 81 is jointly connected to a second input of NOR gate 83 and to respective first inputs of NOR gates 84 and 85. Responsive to all but memory register 71-(N−1) being set, an in-synchronization signal is provided by flip-flop 88 to in-sync terminal 160. Concurrently, the complement of the in-synchronization signal, called a mode signal, is extended from flip-flop 88 over lead 8060 to selector switch 60. Responsive to the mode signal, the output of a memory register is extended through selector switch 60 to an input of a next adjacent memory register. Thereby the input to a memory register is isolated from an output of enable 30. Subsequently, the A1 and A2 bit streams are monitored for the aforementioned unfortuitous condition resembling loss of synchronization. The loss condition is detected through NAND gate 81, inverter 82, NOR gate 84 and flip-flop 87 in response to an output of enable 30, which, but for the isolating by switch 60, would set all memory registers subsequent to an in-synchronization signal having been provided to terminal 160. Thereupon, an error signal is provided by flip-flop 87 to error terminal 170.

On the other hand, the in-synchronization signal can be provided by control circuit 80 immediately upon the achieving of synchronization among the plurality of bit streams. Specifically, although not illustrated in the drawing, a plurality of logic gates 81 and 83 of control circuit 80 can be arranged to detect when all but any one of the memory registers are set. The output of each gate 83 is extended through an OR gate, not shown, to the D input of flip-flop 88. Thereby, an in-synchronization signal is provided to in-sync terminal 160 as soon as synchronization is achieved, and not delayed until all but a predetermined one of the memory registers are set.

The aforementioned circulating manner will now be described. Circulating memory 40 includes inverter 50, selector switch 60 and memory register 70. Inputs to circulating memory 40 are provided over leads 36-1 through 36-N to respective selector switches 61-1 through 61-N. The straightforward logic of each selector switch includes NOR gate 62 and NAND gates 63 and 64 for selectively switching an input to a memory register in response to presence or absence of the aforementioned mode signal. An output of a selector switch is connected over a respective one of leads 67-1 through 67-N to a D input of a corresponding memory register. The selector switch output is extended through the memory register responsive to an A2 clock signal provided at terminal 140. Terminal 140 is jointly connected to the C, or clock, inputs of the memory registers. An output of a memory register is connected to one of inverters 51-N through 51-N over respective leads 76-1 through 76-N. Each inverter is thence connected via a circulating memory output lead 53-1 through 53-N to a respective next adjacent input of comparator enable 30. In connecting a memory register, e.g., register 71-I, over lead 76-I through inverter 51-I onto lead 53-I to a respective second input of NAND gate 31-(I+1) and in incorporating a wrap-around arrangement wherein memory register 71-N is extended to NAND gate 31-1, the circulating manner of extending the outputs of circulating memory 40 to enable 30 is provided.

As a further aid in understanding the principles of my invention, an exemplification of selected operative signals for the illustrative embodiment of FIGS. 1A and 1B are depicted in FIGS. 3A–3F. A first sequential bit stream, illustratively the bit stream of FIG. 2, is applied to A1 bit stream terminal 110. Assuming sequential store 10 can store eight bits, i.e., N = 8, bits numbered 1 through 8 in FIG. 2 are stored respectively in flip-flops 11-1 through 11-8 and parallelly extended over leads 12-1 through 12-8 to respective first inputs of comparator 20. Thereafter, an initializing check signal, illustratively a logic zero, is applied to check sync terminal 150 and extended to clear flip-flop 88 and memory registers 71-1 through 71-8. A second bit stream, identical to the first bit stream but out of synchronization therewith, is serially provided at A2 bit stream terminal 120. Assume that bit number 6, a logic zero in FIG. 2, is the bit of the A2 bit stream currently applied to terminal 120.

FIG. 3A illustrates the outputs of sequential store 10, comparator 20, comparator enable 30, and inverters 50 in response thereto. Specifically, the outputs of comparator 20 are extended over leads 23-1 through 23-8 to respective first inputs of comparator enable 30. The outputs of the respective memory registers, having been reset to a logic zero in response to the initializing synchronization enable signal, are inverted by inverter 50 to provide logic one signals to respective second inputs of comparator enable 30. The outputs of enable 30 are extended over leads 36-1 through 36-8. Since the A1 bits stored in flip-flops 11-1, 11-3, 11-4, 11-7, and 11-8 mismatch the logic zero A2 bit at terminal 120, memory registers 71-1, 71-3, 71-4, 71-7, and 71-8 are set upon memory register detection of an A2 bit clock pulse applied to terminal 140. Thereby, the next adjacent NAND gate of enable 30 is forced to provide a mismatch signal to its corresponding memory register when the next A2 bit is compared even though comparator 20 may subsequently indicate a match of respective bits.

As in FIG. 3B, bit 9 of the A1 bit stream, next applied to A1 bit stream terminal 110, overwrites the contents of flip-flop 11-1, and hence the signal on lead 12-1. Bit 7 of the A2 bit stream is the next A2 bit applied to terminal 120. Responsive thereto, all memory registers but 71-3 and 71-7 are set. However, to achieve synchronization in accordance with the principles of my invention, all memory registers but one need be set. Accordingly, the aforedescribed process continues with bit 10 of the A1 bit stream overwriting the contents of flip-flop 11-2, as illustrated in FIG. 3C. Responsive thereto all memory registers are set except registers 71-4 and 71-8. Again, the process goes on with FIG. 3D illustrating the next signals appearing on the selected leads within synchronizer 100. Finally, as illustrated in FIG. 3E, synchronization is achieved. That is, all memory registers but one, memory register 71-2, are set. However, employing illustrative signal control circuit 80 of FIG. 1B, an in-synchronization signal is not yet provided at in-sync terminal 160 even though synchronization has been achieved. Rather, five more bits in the A1 bit stream, the first illustration of which is shown in FIG. 3F, are received before control circuit 80 detects that all but a predetermined one, i.e., memory register 71-7, are set. In response thereto, an in-synchronization signal is extended to in-sync terminal 160.

Although the invention has been described and illustrated in detail, it is to be understood that the same is by way of illustration and example only. Various modifications will occur to those skilled in the art and the invention is not to be considered limited to the embodiment shown for purposes of disclosure. Thus, the spirit and scope of the invention are limited only by the appended claims.

I claim:

1. In a digital data communication system, a circuit for synchronizing a plurality of bit streams, said circuit including a comparator for comparing a first bit of a first bit stream with a second bit of a second bit stream and characterized in that said circuit further comprises:
    means for comparing said second bit with each of a plurality of bits of said first bit stream and, responsive to a mismatch therebetween, for generating respective mismatch signals,
    a memory having a plurality of registers,
    means responsive to said comparing means for extending each said bit mismatch signal through a corresponding first register of said memory to a second register thereof, and
    means responsive to said extending means for determining when said bit mismatch signals have been extended through all but one of said registers.

2. The synchronizing circuit according to claim 1 further comprising:
    means responsive to said determining means for providing an in-synchronization signal.

3. The synchronizing circuit according to claim 2 further comprising:
    means responsive to said providing means for detecting an error among said plurality of bit streams.

4. The synchronization circuit according to claim 1 further comprising:
    means responsive to said determining means for detecting the absence of synchronization among said plurality of bit streams.

5. The synchronizing circuit according to claim 1 wherein said determining means further comprising:

means for detecting when said bit mismatch signals have been extended through all but a predetermined one of said registers.

6. The synchronizing circuit according to claim 5 further comprising:
means responsive to said detecting means for providing an in-synchronization signal.

7. The synchronizer according to claim 6 further comprising:
means responsive to said providing means for detecting an error among said plurality of bit streams.

8. In a digital data communication system, a circuit for synchronizing a plurality of bit streams, said circuit comprising:
a first and a second bit stream terminal,
means for connecting said first bit stream terminal to a plurality of bit buffers,
means for connecting an output from each of said bit buffers to respective first inputs of a plurality of comparators,
means for connecting said second bit stream terminal in common to a second input of each of said plurality of comparators,
means for connecting respective comparator outputs to respective first inputs of a plurality of comparator enables,
means for connecting respective outputs of said plurality of comparator enables to a memory; said memory including a plurality of registers, and
means for connecting in a circulating manner an output of each of said respective registers to a respective second input of a comparator enable.

9. The synchronizing circuit according to claim 8 further comprising:
means circuitwise interposed for determining when an output signal of all but one of said memory registers corresponds to a predetermined set signal.

10. The synchronizing circuit according to claim 9 further comprising:
means responsive to said determining means for providing an in-synchronization signal.

11. The sychronizing circuit according to claim 10 further comprising:
means responsive to said providing means for detecting an error among said plurality of bit streams.

12. The synchronizing circuit according to claim 9 further comprising:
means responsive to said determining means for detecting the absence of synchronization among said plurality of bit streams.

13. The synchronizing circuit according to claim 8 further comprising:
means circuitwise interposed for detecting when an output signal of all but a predetermined one of said memory registers corresponds to a predetermined set signal.

14. The synchronizing circuit according to claim 13 further comprising:
means responsive to said output signal detecting means for providing an in-synchronization signal.

15. The synchronizing circuit of claim 14 further comprising:
means responsive to said providing means for detecting an error among said plurality of bit streams.

16. The synchronizing circuit according to claim 15 further comprising:
means responsive to said error detecting means for providing an error signal.

17. The synchronizing circuit according to claim 13 further comprising:
means responsive to said output signal detecting means for detecting the absence of synchronization among said plurality of bit streams.

* * * * *

UNITED STATES PATENT AND TRADEMARK OFFICE
CERTIFICATE OF CORRECTION

PATENT NO. : 3,959,589

DATED : May 25, 1976

INVENTOR(S) : Charles A. von Roesgen

It is certified that error appears in the above-identified patent and that said Letters Patent are hereby corrected as shown below:

Column 5, line 16, "51-N", first occurrence, should read --51-1--.

Signed and Sealed this

Fifth Day of October 1976

[SEAL]

Attest:

RUTH C. MASON
*Attesting Officer*

C. MARSHALL DANN
*Commissioner of Patents and Trademarks*